United States Patent
Krause et al.

(10) Patent No.: US 7,152,479 B2
(45) Date of Patent: Dec. 26, 2006

(54) PRESSURE TRANSMITTER HAVING A PRESSURE SENSOR OF MICROMECHANICAL DESIGN

(75) Inventors: Peter Krause, Frankfurt an der Oder (DE); Arno Steckenborn, Berlin (DE)

(73) Assignee: Siemens Aktiengesellschaft, Munich (DE)

(*) Notice: Subject to any disclaimer, the term of this patent is extended or adjusted under 35 U.S.C. 154(b) by 595 days.

(21) Appl. No.: 10/619,582

(22) Filed: Jul. 16, 2003

(65) Prior Publication Data
US 2006/0144151 A1 Jul. 6, 2006

(30) Foreign Application Priority Data
Jul. 16, 2002 (DE) ............................. 102 32 721

(51) Int. Cl.
*G01M 15/00* (2006.01)
(52) U.S. Cl. ........................... 73/715; 73/756
(58) Field of Classification Search ................ 73/715, 73/708, 714, 723, 756
See application file for complete search history.

(56) References Cited

U.S. PATENT DOCUMENTS

| | | | | |
|---|---|---|---|---|
| 4,856,350 A | * | 8/1989 | Hanson | .................... 73/862.59 |
| 4,885,983 A | * | 12/1989 | Zavoda | ........................ 92/104 |
| 5,587,607 A | | 12/1996 | Yasuda et al. | |
| 5,606,117 A | * | 2/1997 | Vogel et al. | .................... 73/115 |
| 5,614,677 A | | 3/1997 | Wamsiedler et al. | |
| 5,883,779 A | * | 3/1999 | Catanescu et al. | ........ 361/283.1 |

2003/0146447 A1 * 8/2003 Sautter et al. .............. 257/108

FOREIGN PATENT DOCUMENTS

| | | |
|---|---|---|
| DE | 41 06 102 | 9/1992 |
| DE | 196 03 674 | 8/1997 |
| DE | 196 44 830 | 2/1998 |
| DE | 198 10 756 | 9/1999 |
| DE | 198 44 808 | 4/2000 |
| WO | WO 86/02446 | 4/1986 |
| WO | WO 88/01049 | 2/1988 |
| WO | WO 00/33047 | 6/2000 |

OTHER PUBLICATIONS

Oosterbroek et al., "A Micromachined pressure/flow-sensor", Sensors and Actuators 77, 1999, pp. 167-177.

* cited by examiner

*Primary Examiner*—Michael Cygan
*Assistant Examiner*—Andre Allen
(74) *Attorney, Agent, or Firm*—Young & Thompson

(57) ABSTRACT

A pressure transmitter has a housing (11) on which a pressure sensor (12) is fastened. There is provided in the housing a region, produced micromechanically, with reduced wall thickness that forms a separating diaphragm (22) such that the fluid located in a channel (16) does not act on the pressure sensor (12). The pressure sensor (12) is connected with a sensor diaphragm (24) directly to the separating diaphragm via a connecting layer (23), thereby rendering possible a highly space-saving design of the pressure transmitter. Consequently, the pressure transmitter can be formed, for example, by the pressure sensor and a channel structure, for example a microreactor, produced in a micromechanical design. A small dead volume in the channel structure is thereby produced in the region of the pressure transmitter.

10 Claims, 1 Drawing Sheet

PRESSURE TRANSMITTER HAVING A PRESSURE SENSOR OF MICROMECHANICAL DESIGN

FIELD OF THE INVENTION

The invention relates to a pressure transmitter having a housing of micromechanical design, in which a cavity is located for a fluid whose pressure is to be measured, and on which there is fastened a diaphragm-type pressure sensor of micromechanical design.

BACKGROUND OF THE INVENTION

Such a pressure sensor is known, for example, from the article entitled "A micromachined pressure/flow-sensor" by Oosterbroek et al., which appeared in Sensors and Actuators 77 (1999), pages 167 to 177. In accordance with FIG. 2 of this document, a pressure transmitter is described in which a branched cavity is constructed in a housing as a channel system that serves to hold a fluid whose pressure is to be measured. Fastened on this housing are two diaphragm-type pressure sensors that constitute an integral component of the housing and thus form the cavity together with the housing. Consequently, the fluid can be applied directly to the diaphragms of the sensors, it being possible to determine their deformation in a piezoresistive fashion on the basis of the pressure applied by the fluid.

It is also known to adapt diaphragm-type pressure sensors of micromechanical design to systems not produced micromechanically, for example those from the foodstuffs sector. In accordance with DE 198 10 756 A1, this is accomplished with the aid of a carrier substrate on which the pressure sensor produced in a micromechanical design is fastened. The pressure transmitter can then be installed together with the carrier substrate in an installation opening, suitable therefor, of a pressure vessel for example, the carrier substrate rendering possible an installation described in DE 198 10 756 A1 as join-optimized, that is to say installation is possible in a surface-flush fashion with reference to the inner surface of the pressure vessel such that it is possible to comply with the hygiene regulations by means of a simplified possibility of cleaning the system as used, for example in the food industry.

SUMMARY OF THE INVENTION

It is the object of the invention to specify a pressure transmitter having a housing of micromechanical design, and a pressure sensor that is easy to produce and operate.

This object is achieved according to the invention by virtue of the fact that constructed in the housing as a region of the housing with thinned wall thickness is a separating diaphragm that is connected on one of its sides to the diaphragm-type pressure sensor, and on the other side of which the fluid with the pressure that is to be measured can be applied. The separating diaphragm thus separates from one another the functions of the pressure transmitter for creating in a housing a cavity for the fluid with the pressure to be measured, and determining the pressure of the fluid by means of the pressure sensor. The following advantages ensue therefrom.

The pressure sensor can be designed as a standard component such that the outlay on the design of the pressure sensor occurs only once, and the component can be produced in large batch quantities. This advantageously simplifies the production of different pressure transmitters in the case of which only the micromechanically produced housing need be varied. The separating diaphragm in this case simultaneously protects the pressure transmitter from the fluid such that the pressure transmitter need not be resistant to the fluid having the pressure to be measured. Furthermore, the configuration of the housing itself is also simplified, since when producing the pressure transmitter the pressure sensor need not be fabricated as an integral component, also forming the cavity, of the housing, but can be mounted on the finished housing. In the case of structures of micromechanical design, the separation of the functions therefore advantageously also simplifies the production method.

In accordance with a development of the invention, the connection between the separating diaphragm and the diaphragm-type pressure sensor produces a bias in the connected diaphragms. This bias can be produced, for example, by the already mentioned coating of one or both juxtaposed diaphragms, the coating thickness being greater than the gap width between the diaphragms. Consequently, the functional reliability of the pressure transmitter can advantageously be improved, since the bias ensures a reliable transmission of the pressure to be measured from the separating diaphragm to the measuring diaphragm of the pressure sensor.

In accordance with a particularly advantageous refinement of the invention, the part of the housing having the separating diaphragm is formed from a base substrate. The base substrate can be processed by means of the methods known in microtechnology, for example by micromilling or etching. Consequently, the pressure transmitter can be fabricated completely in a micromechanical fashion. In this embodiment of the housing, the pressure sensor can advantageously also easily be integrated in a channel structure of micromechanical design, for example a microreactor, the channel structure also being formed by the housing.

It is advantageous for the micromechanical design of the separating diaphragm when the base substrate is designed in a multiplayer fashion with a first layer forming the separating diaphragm, an etching stop layer following thereupon, and a second layer which follows thereupon and in which for the purpose of forming the separating diaphragm the cavity is produced by etching as far as down to the etching stop layer. The etching stop layer thereby advantageously permits high-precision fabrication of the separating diaphragm with a defined thickness. It is thereby possible largely to eliminate production inaccuracies owing to the production method. It is possible in this case to have recourse to conventional base substrates on the market with an appropriate design.

An advantageous embodiment of the pressure transmitter provides that for the purpose of forming a sensor diaphragm of the diaphragm-type pressure sensor in a sensor substrate an annular depression is constructed such that the part of the sensor substrate located in the interior of the depression forms a reinforcing structure for the sensor diaphragm that is connected to the separating diaphragm. The annular depression can have a circular course, but it is equally possible for it to have another course such as, for example, a rectangular course in the surface of the sensor substrate. The reinforcing structure advantageously ensures a functional integration, specifically, on the one hand, it reinforces the sensor diaphragm in order to achieve a defined pressure-displacement behavior and, on the other hand, it produces a rigid connection between the sensor diaphragm and the separating diaphragm. The functional integration advantageously further contributes to reducing the installation space required for the pressure transmitter.

Another embodiment of the pressure transmitter provides that a depression is constructed for the purpose of forming a sensor diaphragm of the diaphragm-type sensor in a sensor substrate, and the side of the sensor diaphragm averted from the depression is connected to the separating diaphragm. The separating diaphragm thereby advantageously directly adjoins the sensor diaphragm, and so a transmitting element can be dispensed with or, as already mentioned, can be formed by coating one of the diaphragms.

In this embodiment of the pressure transmitter, it is advantageous when electrical conducting structures provided on the housing, in particular on the base substrate, are connected by means of contact bumps to electrical conducting structures provided on the sensor substrate. It is advantageously possible in this case to have recourse to the so-called flip-chip technology, which is known per se, in order to achieve electric contact between the pressure sensor and the further parts of the pressure transmitter. On the side facing the housing, the pressure sensor is provided with the contact bumps, which can be used at the same time to fix it on the housing. The advantage of the variant described resides in that the electric terminals can be miniaturized, as a result of which a further reduction in the overall size of the pressure transmitter can be achieved.

The housing advantageously has at least one connection for the fluid. The connection can be used to attach the pressure transmitter to arbitrary structures, a fluid connection being produced between this structure and the pressure transmitter. It is thereby possible for the entire pressure transmitter to be fabricated as a standard part, the result being a wide field of use. It is particularly advantageous when the housing is equipped with an inlet and an outlet for the fluid. The pressure can thereby be measured using the through-flow method, as a result of which a rapid flushing of the pressure measuring chamber and, in association therewith, short dead times for the process proceeding in the housing are entailed, particularly in the case of alternating fluids.

Another embodiment of the invention provides that the cavity is constructed in such a way that it forms a channel structure which can be flowed through at least substantially in a laminar fashion from the inlet to the outlet. A channel structure which can be flowed through in a laminar fashion can be constructed by virtue of the fact that sudden cross-sectional jumps are avoided in the channel structure. Furthermore, the construction of channel parts with a dead end must be completely avoided. These measures are advantageously suitable for preventing the construction of so-called dead volumes in which a uniform exchange of a fluid flowing in the cavity is rendered difficult or even completely prevented by the formation of eddies. If the channel structure can be flowed through in a substantially laminar fashion from the inlet to the outlet, this has the advantage that all the fluid located in the cavity can be exchanged in a very short time. This enables the use of the pressure transmitter according to the invention even in the case of alternating fluids which are to be measured—in particular, it is also possible to carry out a rinsing operation of the channel structure between a change of fluid in a very short time.

The configuration of pressure transmitter having a separating diaphragm for the pressure sensor, and of a cavity that is independent of the pressure sensor and forms the channel structure is particularly conducive to the formation of a channel structure that can be flowed through in a substantially laminar fashion since, owing to the separate construction of housing and pressure sensor, it is possible to produce channel structures which have a geometry of particularly simple configuration and enable the fluid to flow through in a laminar fashion.

An additional embodiment of the invention provides that a temperature sensor is fitted on the side of the separating diaphragm averted from the fluid. It is thereby possible to undertake temperature monitoring of the fluid simultaneously by means of the pressure transmitter in conjunction with a low outlay on space. The temperature sensor can be fitted directly on the separating diaphragm such that a direct temperature measurement is possible because of the comparatively thin wall thickness of the diaphragm. A further reduction in the installation space required for the sensors is advantageously possible owing to the functional integration of the measurement of pressure and temperature.

BRIEF DESCRIPTION OF THE DRAWINGS

Further details of the invention are described below with the aid of the drawings, in which.

DETAILED DESCRIPTION OF THE INVENTION

Figure 1:
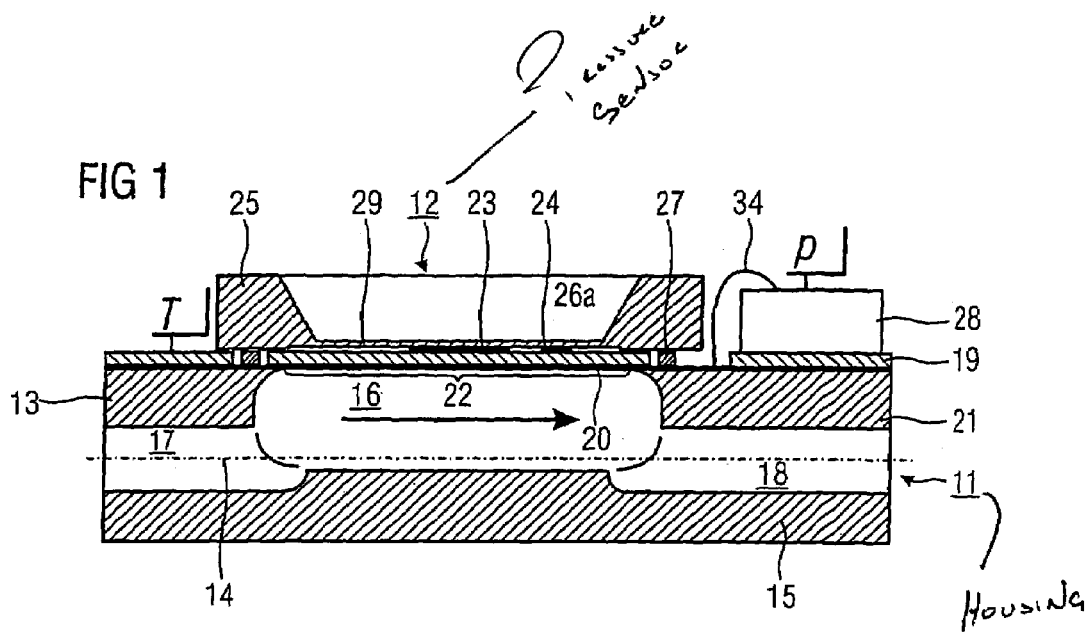
FIG. 1 shows as a diagrammatic section an exemplary embodiment of a pressure transmitter in the case of which the pressure sensor is mounted using flip-chip technology.

The pressure transmitter illustrated in FIG. 1 comprises in essence a housing 11 and a pressure sensor 12. The housing 11 has a base substrate 13 that is connected by bonding to a cover part 15 along a parting joint 14. Constructed in the joint between the base substrate and cover part is a cavity 16 that has an inlet 17 and an outlet 18 for a fluid whose pressure is to be measured.

The base substrate comprises a first layer 19, an etching stop layer 20 following thereupon and a second layer 21 following thereupon. The cavity 16 is produced by etching the second layer 21 of the base substrate. The second layer is etched down as far as the etching stop layer 20, so that the etching stop layer and the first layer 19, situated on the other side of the etching stop layer, form a separating diaphragm 22. The base substrate can be, for example, an SOI-Si wafer (silicon on insulator—silicon wafer), the "insulator layer" constituting the etching stop layer 20. Alternatively, however, the cavity in the base substrate can also be produced, for example, as a ceramic shaped part by laminating so-called greentapes.

The separating diaphragm is connected via a connecting layer 23, which can be formed, for example, from silicon oxide or from a polymer, to a sensor diaphragm 24 that is formed as part of a sensor substrate 25 by etching a depression 26a. The pressure sensor is fixed by means of contact bumps 27 in the region of the separating diaphragm, that is to say of the part of the housing with a thinned wall thickness, the contact bumps 27 simultaneously serving the purpose of electric connection between conducting structures (not illustrated in more detail) on the pressure sensor and the housing.

If the separating diaphragm 22 is exposed to the application of pressure because of the fluid located in the cavity 16, it bends toward the sensor diaphragm, which is likewise deformed because of the rigid connection via the connecting layer 23. This deformation is detected by means of resistors (not illustrated) implanted at the edge of the sensor diaphragm 24 or diffused. These resistors are connected via the contact bumps 27 to an evaluation unit 28 that supplies a pressure signal p.

Furthermore, there is formed on the separating diaphragm 22 a temperature sensor 29 which can, for example, consist of a metal layer whose resistance varies as a function of temperature. A temperature signal T can be produced via a corresponding electric connection.

Figure 2:
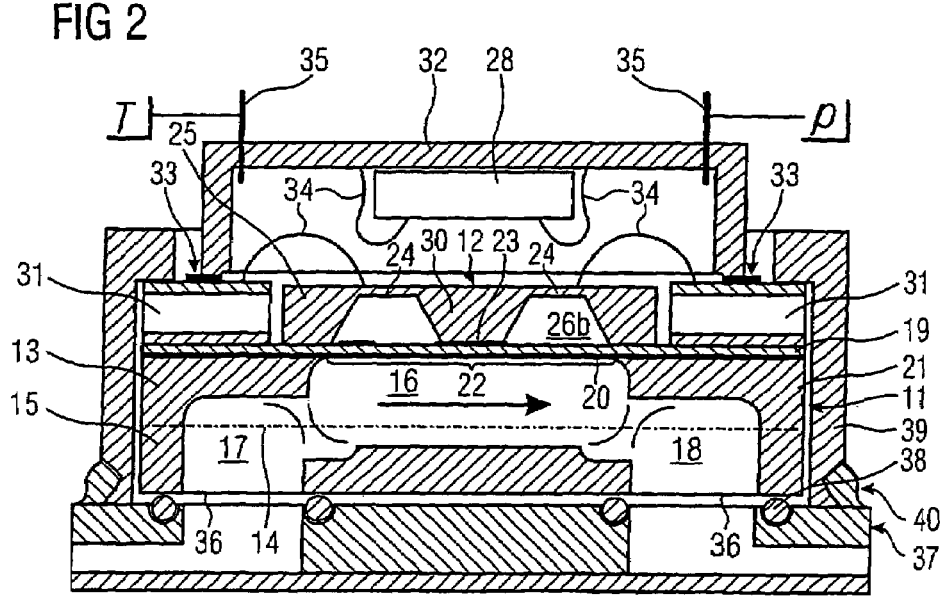
FIG. 2 shows, as a diagrammatic section, an exemplary embodiment of a pressure transmitter having a pressure sensor that has a reinforcing structure for the sensor diaphragm.

FIG. 2 shows an alternative refinement of a pressure transmitter according to the invention, components whose function corresponds to the pressure transmitter in accordance with FIG. 1 being provided with the same reference symbols and not explained in more detail.

The pressure transmitter in accordance with FIG. 2 differs in terms of the fitting of the temperature sensor 12. The sensor diaphragm 24 is constructed as an annular depression 26b such that a reinforcing structure 30 is formed within this annular depression. This reinforcing structure increases the stiffness of the diaphragm 24, whose deformation can thereby be produced with a defined geometry. Furthermore, the reinforcing structure 30 is connected via the connecting layer 23 to the separating diaphragm 22, and this is performed, by mounting the pressure sensor 12 on the region with the separating diaphragm 22 of the housing 11, in such a way that the depression faces the housing. The pressure sensor can be connected to the housing by bonding, for example.

Also fastened on the housing is a support structure 31 for holding a protective cap 32 for the pressure sensor 12. The protective cap is connected to the support structure 31 via solder joints 33, the evaluation unit 28 being accommodated at the same time in the protective cap. The solder joints 33 and bond wires 34 ensure electric contact between the pressure sensor 11 and the evaluation unit 28 by means of conductor tracks (not illustrated in more detail) that are provided in the protective cap 32, the support structure 31 and the pressure sensor 12. Contact is made in the same way with plug-in connections 35 in the protective cap, which permits the sensor signals p, T to be read out.

In the exemplary embodiment in accordance with FIG. 2, the inlet 17 and the outlet 18 are each constructed as a connection 36. The pressure transmitter is connected via the connections 36 to a carrier plate 37 that includes a channel system of micromechanical design. This channel system forms a microreactor, for example. The connections are sealed via O-rings 38. Fixing the pressure transmitter 11 on the carrier plate 37 is ensured by a fastening clamp 39 that is supported on the support structure 31 and is connected to the carrier plate 37 by means of a latching connection 40.

What is claimed is:

1. A pressure transmitter having a housing (11) of micromechanical design,
   in which a cavity (16) is located for a fluid whose pressure is to be measured, and
   on which there is fastened a diaphragm-type pressure sensor (12) of micromechanical design,
   wherein constructed in the housing as a region of the housing (11) with thinned wall thickness is a separating diaphragm (22) that is connected on one of its sides to the diaphragm-type pressure sensor (12), and on the other side of which the fluid with the pressure that is to be measured can be applied.

2. The pressure transmitter as claimed in claim 1, wherein the connection between the separating diaphragm (22) and the diaphragm-type pressure sensor (12) produces a bias in the connected diaphragms.

3. The pressure transmitter as claimed in claim 1, wherein the part of the housing (11) that has the separating diaphragm is formed from a base substrate (13).

4. The pressure transmitter as claimed in claim 3, wherein the base substrate (13) is designed in a multilayer fashion with a first layer (19) forming the separating diaphragm (22), an etching stop layer (20) following thereupon, and a second layer (21) which follows thereupon and in which for the purpose of forming the separating diaphragm the cavity (16) is produced by etching as far as down to the etching stop layer (20).

5. The pressure transmitter as claimed in claim 1, wherein for the purpose of forming a sensor diaphragm (24) of the diaphragm-type pressure sensor in a sensor substrate (25) an annular depression (26b) is constructed such that the part of the sensor substrate (25) located in the interior of the depression (26b) forms a reinforcing structure (30) for the sensor diaphragm that is connected to the separating diaphragm (22).

6. The pressure transmitter as claimed in claim 1, wherein a depression (26a) is constructed for the purpose of forming a sensor diaphragm (24) of the diaphragm-type sensor (12) in a sensor substrate (25), and the side of the sensor diaphragm (24) averted from the depression (26a) is connected to the separating diaphragm (22).

7. The pressure transmitter as claimed in claim 6, wherein electrical conducting structures provided on the part of the housing of micromechanical design are connected by contact bumps (27) to electrical conducting structures provided on the sensor substrate (25).

8. The pressure transmitter as claimed in claim 1, wherein the housing (11) is equipped with an inlet (17) and an outlet (18) for the fluid.

9. The pressure transmitter as claimed in claim 8, wherein the cavity (16) is constructed in such a way that it forms a channel structure which can be flowed through at least substantially in a laminar fashion from the inlet (17) to the outlet (18).

10. The pressure transmitter as claimed in claim 1, wherein a temperature sensor (29) is fitted on the side of the separating diaphragm (22) averted from the fluid.

* * * * *